Patented Dec. 22, 1953

2,663,644

UNITED STATES PATENT OFFICE 2,663,644

PREPARATION OF MILK POWDER

Francis Frederick Hansen, Pittsburgh, Pa.

No Drawing. Application December 19, 1950,
Serial No. 201,704

6 Claims. (Cl. 99—56)

This invention relates to a process of producing a dry powdered milk for use in the baking industry. More particularly, the invention relates to a dry skim milk powder adapted for use in any desired quantity to improve the volume and oven-spring of products made from yeast rising baking dough.

It is well known that the baking industry employs enormous quantities of milk in various forms, such as skimmed milk and whole milk, either liquid or in powdered form. Customarily, because of their keeping qualities, lack of bulk and ease of handling, milk powders are usually employed.

Considerable trouble is experienced from time to time in the use of such milk powders, such difficulties appearing to be due to the presence of certain reducing substances in the milk. These reducing substances are sulphur-bearing materials that may be grouped under the designation of sulphydrils, and include glutathione and cysteine, and are not to be confused with casein containing sulphur in which the sulphur is inert. The presence of such sulphur-bearing substances materially affects the volume and texture of the finished baked goods, they affect the protein structure and the volume and oven-spring of the dough. It is a universal custom to employ more yeast, yeast food, time, and temperature in sponges or straight doughs when these milk powders are used.

The presence of such sulphur-bearing reducing materials in the milk powders requires the employment of oxidizing agents in order to overcome the foregoing disadvantages. Thus, it is customary to use potassium bromate as an oxidizing agent, and researches have proven that more potassium bromate or other oxidizing chemicals are required to produce good bread when milk powders are used in the formula for preparing the dough. The reason for this is that these oxidizing chemicals are necessary to oxidize the said reducing substances in milk so that they will not interfere with the normal fermentation of the yeast and the desired volume or oven-spring of the dough.

In accordance with the present invention, it is found that the reducing properties of the above-identified sulphur compounds are eliminated by exposing the milk powders to the action of the ultra-violet light, and utilizing the resulting irradiated milk powder instead of normal or untreated milk powders in the baking formulas.

In carrying out the present invention dried skimmed milk is powdered in any suitable way well-known to the art. The resulting powdered product is strongly irradiated by the action of ultra-violet light. This irradiation is of a quality and intensity to effect oxidation of the sulphur compounds in the milk, which as above noted, are designated as sulphydril compounds, and which are always present in milk. Such sulphydril compounds include glutathione, cysteine, and other compounds, all of which contain —S—H groups, these groups giving the reducing properties to these sulphydril compounds. The oxidation produced in the present process oxidizes these compounds and converts the sulphydril group (—S—H groups) into straight sulphur groups —S—S—, this rearrangement of sulphur linkages removing the objectionable reducing properties.

The ultra-violet light irradiation is applied strongly to the powdered dried skim milk obtained from any variety of liquid skim milk. In practice, the irradiation may be carried out in several ways.

Thus, the skim milk powder may be continuously stirred during the exposure to the ultra-violet light, the source or sources of such light being in close proximity to the powder, the stirring being continuous during the exposure so that all particles of the powdered milk will be brought into prolonged exposure to the ultra-violet light.

Or the milk powder may be irradiated by injecting it into a closed chamber flooded interiorly with ultra-violet light of high intensity and short wave-length.

Or, further, the milk powder may be carried past the source of ultra-light light on a slowly moving conveyor belt, with agitation of the powder on the belt to effect the irradiation.

For example, in one embodiment of the invention, a plurality of belts, one above the other, is used and so arranged that after the powder would move along the entire length of an upper belt, it drops onto an end of a lower belt and moves along the entire length thereof and after that, drops onto a still lower belt and so on, so as to provide prolonged exposure as well as agitation of the powder. A plurality of 100 watt quartz mercury vapor lamps are used emitting wave lengths as short as 2500 Angstrom units. These lamps are set four inches apart and four inches above the milk powder layer traveling on the belts. The milk powder layer is of the order of $\frac{1}{32}$ to $\frac{1}{64}$ of an inch in thickness. Thus the rays spread out from each lamp so that all of the traveling powder is continuously exposed to ultra-violet rays. As the milk powder falls from one belt to a lower belt, suitable guides of a well-known construction are used for spreading the powder spread thinly and evenly over the entire width of the belt and in this manner, new surfaces are exposed to the ultra-violet rays as the powder travels with and is dropped from one belt onto a lower belt.

The milk powder described above is first hammer milled and finely ground and disintegrated so as to pass through at least a 200 mesh screen before introduction onto the first belt through a chute or hopper covering almost the full belt width for subsequent irradiation with ultra-violet rays.

With a drier containing ten belts twelve feet long driven at a rate of four feet per minute the powder is exposed to the ultra-violet light for about thirty minutes. It requires about thirty-five minutes for dry powder to pass across the ten belts for treatment in the treating chamber. The belts used are twenty-four inches wide. An electric vibrator is mounted on the chute above each belt to prevent the milk powder bridging or clogging up the mouth of the chute. A vibrating feeder is mounted above the delivery chute to deliver a predetermined amount of milk powder, which feeder is as wide as the chute so as to discharge the milk powder evenly across the belt.

With a high wattage mercury vapor lamp, and while maintaining a temperature in the treating chamber of 175° to 200° F., the sulphydril compounds having the reducing action due to their —S—H radicals oxidized to neutral —S—S radicals with an exposure of twenty to twenty-five minutes to ultra-violet light depending upon the quantity of sulphydril compounds in the powdered milk. It is preferred to use 100 watt mercury vapor lamps, and expose the powdered milk to 2500 to 3000 Angstrom units wave length for a period of twenty to forty minutes, the length of period depending upon the quantity of sulphydril compounds having a reduced action that are contained in the dry milk.

While a higher wattage lamp, such as a 600 watt mercury quartz lamp, may be used, this would emit too much heat, causing undesirable milk powder changes during the thirty minute exposure. The above-described lower wattage lamps (preferably to give a temperature not exceeding 200° F.) are preferred since they produce less heat and accomplish the changes desired in the powdered milk. Temperatures of the order of 150° F. to 160° F. during irradiation are satisfactory, in fact, temperatures may be kept down as low as 100° F. without interfering with the irradiation sought.

The irradiated milk powder after passing through the dried is then run through a tunnel through which cold air is blown to cool it sufficiently (80° F. to 90° F.), after which it is barrelled or sacked for shipment or usage.

The first of the above procedures is preferred, as it is easily carried out and easily controlled.

The irradiation is carried out by exposing the milk powder for about thirty minutes to short wave length ultra-violet light of the order of 2500 to 3000 Angstrom units.

The foregoing description indicates the preferred embodiments of the invention, the operative details of which may be varied, if desired, to apply the invention to any particular circumstance or condition, as will be apparent to one skilled in the art; and accordingly, it will be understood that the above-described procedure may be modified in many ways in order to adapt the invention to varying conditions and uses, as indicated by the following claims.

The finished treated product in which the —S—H radicals of the sulphydril compounds are changed to —S—S radicals is specifically claimed in my copending application Serial No. 201,703, filed December 19, 1950, entitled Milk Powder and Its Preparation.

This application is a continuation-in-part of my application Serial No. 625,940, filed October 31, 1945, now abandoned.

The preferred form of the invention having been thus described, what is claimed as new is:

1. A process of treating a dry skim milk powder to particularly eliminate its reducing action to adapt it to improve the volume and oven-spring of yeast rising baking dough, comprising reducing the mlik to a powder of a minimum of two hundred mesh, thoroughly exposing the particles of the powder to irradiation with ultra-violet light of 2500 to 3000 Angstrom wave lengths for a period of twenty to forty minutes to complete the oxidation of the —S—H radicals of the sulphydrils to neutral —S—S radicals.

2. The process defined in claim 2 in which the milk continuously passes as a series of wide thin ribbons through a treating chamber while the ribbons of powder are repeatedly redistributed on following ribbons to continuously and thoroughly expose each particle to ultra-violet light.

3. The process defined in claim 2 in which the thin ribbon layers of dry milk have a thickness of $\frac{1}{64}$ to $\frac{1}{32}$ of an inch.

4. The process defined in claim 1 in which the milk is exposed to ultra-violet light which develops a temperature to 150° to 160° F. in the treating chamber.

5. The process defined in claim 3 in which the powdered milk is exposed to ultra-violet light for a period of approximately 30 minutes.

6. The process defined in claim 1 in which the milk is exposed as a thin moving body to irradiation of ultra-violet light emitted by 100 watt mercury vapor lamps spaced about four inches from the moving body.

FRANCIS FREDERICK HANSEN.

No references cited.